United States Patent
Nagarajan et al.

(10) Patent No.: US 10,575,256 B2
(45) Date of Patent: *Feb. 25, 2020

(54) ENERGY BUDGETED SYSTEM RECOVERY

(71) Applicant: Apple Inc., Cupertino, CA (US)

(72) Inventors: Viswanath Nagarajan, San Jose, CA (US); Lakshmi N. Kavuri, San Jose, CA (US); Srinivasan Nimmala, San Jose, CA (US); Swapna V. Iyer, San Jose, CA (US); Sindhu Sivasankaran Nair, Walnut Creek, CA (US); Sunny Arora, San Jose, CA (US); Jianxiong Shi, Dublin, CA (US); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,247

(22) Filed: Feb. 20, 2019

(65) Prior Publication Data

US 2019/0182776 A1  Jun. 13, 2019

Related U.S. Application Data

(63) Continuation of application No. 15/694,483, filed on Sep. 1, 2017, now Pat. No. 10,225,803.

(51) Int. Cl.
*H04W 52/02* (2009.01)
*H04W 48/16* (2009.01)
*H04W 88/02* (2009.01)
*H04W 36/24* (2009.01)
*H04W 4/80* (2018.01)

(52) U.S. Cl.
CPC ....... *H04W 52/0261* (2013.01); *H04W 48/16* (2013.01); *H04W 4/80* (2018.02); *H04W 36/245* (2013.01); *H04W 52/0258* (2013.01); *H04W 88/02* (2013.01)

(58) Field of Classification Search
CPC .. H04B 17/336; H04B 17/382; H04B 47/122; H04B 45/122; H04B 41/0663; H04W 36/0083; H04W 36/0058; H04W 88/06; H04W 48/16; H04W 48/18; H04W 52/00
See application file for complete search history.

(56) References Cited

U.S. PATENT DOCUMENTS

| | | |
|---|---|---|
| 9,088,859 B2 | 7/2015 | Egner et al. |
| 9,485,718 B2 | 11/2016 | Vuchula et al. |
| 2012/0135696 A1* | 5/2012 | Lerzer ............... H04W 52/0296 455/127.1 |
| 2013/0123999 A1* | 5/2013 | Pereira ............... G05D 23/1924 700/295 |
| 2015/0192889 A1* | 7/2015 | Osawa ............... G03G 15/5075 399/88 |
| 2016/0345217 A1 | 11/2016 | Tabet et al. |

* cited by examiner

*Primary Examiner* — Mewale A Ambaye
(74) *Attorney, Agent, or Firm* — Kowert Hood Munyon Rankin and Goetzel PC; Jeffrey C. Hood

(57) ABSTRACT

This disclosure relates to energy budgeted cellular service recovery techniques. A wireless device may determine one or more energy budgets for service recovery. It may be determined that cellular service loss is currently occurring. Cellular service recovery may be attempted, where service recovery scan timing for the attempt to recover cellular service is determined based at least in part on the one or more energy budgets for service recovery.

20 Claims, 10 Drawing Sheets

ENERGY BUDGETED SYSTEM RECOVERY

PRIORITY CLAIM

This application claims priority to U.S. patent application Ser. No. 15/694,483, entitled "Energy Budgeted System Recovery" filed Sep. 1, 2017, now U.S. Pat. No. 10,225,803, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for a wireless device to perform system recovery in accordance with one or more energy budgets.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a wireless device to perform system recovery in accordance with one or more energy budgets.

The wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing loss of cellular service more commonly than a wireless device with greater communication range.

Recovering from loss of cellular service is commonly a heavily power consuming process, but battery power is also commonly a limited resource for wireless devices in general (and link budget limited devices in particular), so managing the power consumption resulting from cellular service recovery operations may be desirable. Techniques for managing cellular service recovery operations within one or more energy budgets may help support whatever balance is desired between maintaining service availability and preserving battery power/life. Such techniques may be of particular use for a wireless device that may be expected to have a cellular communication service coverage area with more frequent coverage gaps than other wireless devices, since such a wireless device may experience radio link failure and out-of-service conditions more frequently.

Accordingly, techniques are described herein for managing cellular service recovery operations within one or more energy budgets. The energy budgets may include a periodic (e.g., hourly) energy budget, a per-search/scan energy budget, and/or any of various other budgets. Cellular service recovery operations, such as searching for available cells within communication range, may be performed at intervals selected based on available energy within the energy budget(s) being observed, and based on the power consumption expected for the given cellular service recovery operations. If desired, the scope (e.g., number of frequencies/bands scanned, length of time spent scanning) of the cellular service recovery operations performed at a given time may also or alternatively be selected based at least in part on the energy budget(s) being observed. As another possibility, the energy budget(s) being observed may be selected based at least in part on the scope of planned cellular service recovery operations.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
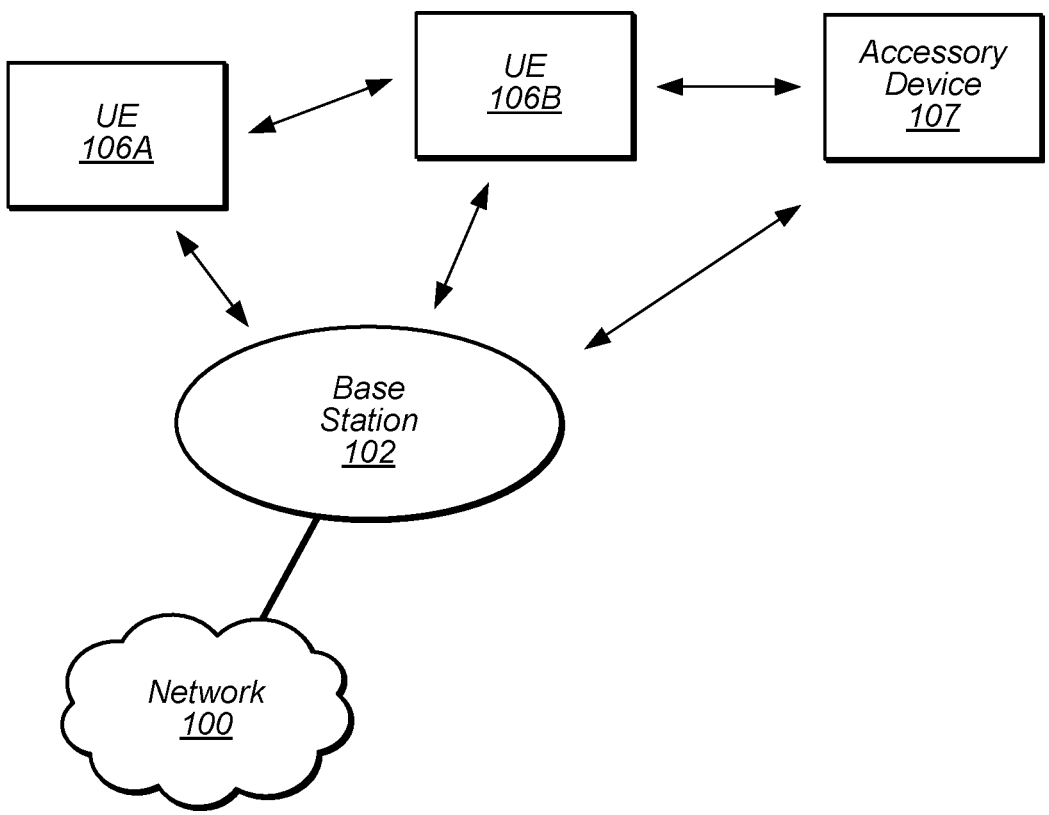
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
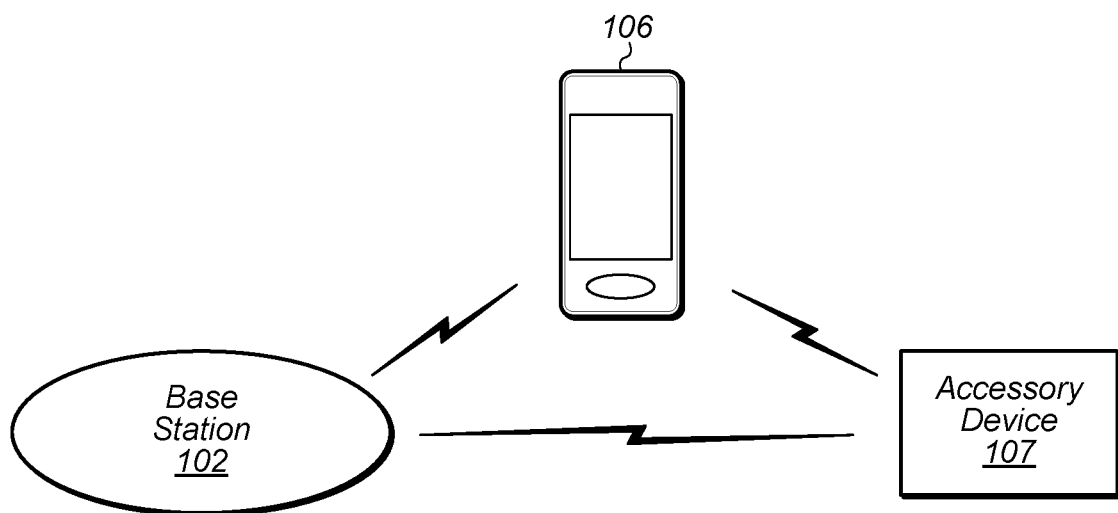
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, the UE 106A and UE 106B may be capable of arranging and performing D2D communication (e.g., including D2D discovery communications) with each other even when out-of-coverage of the BS 102 and other cellular base stations.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
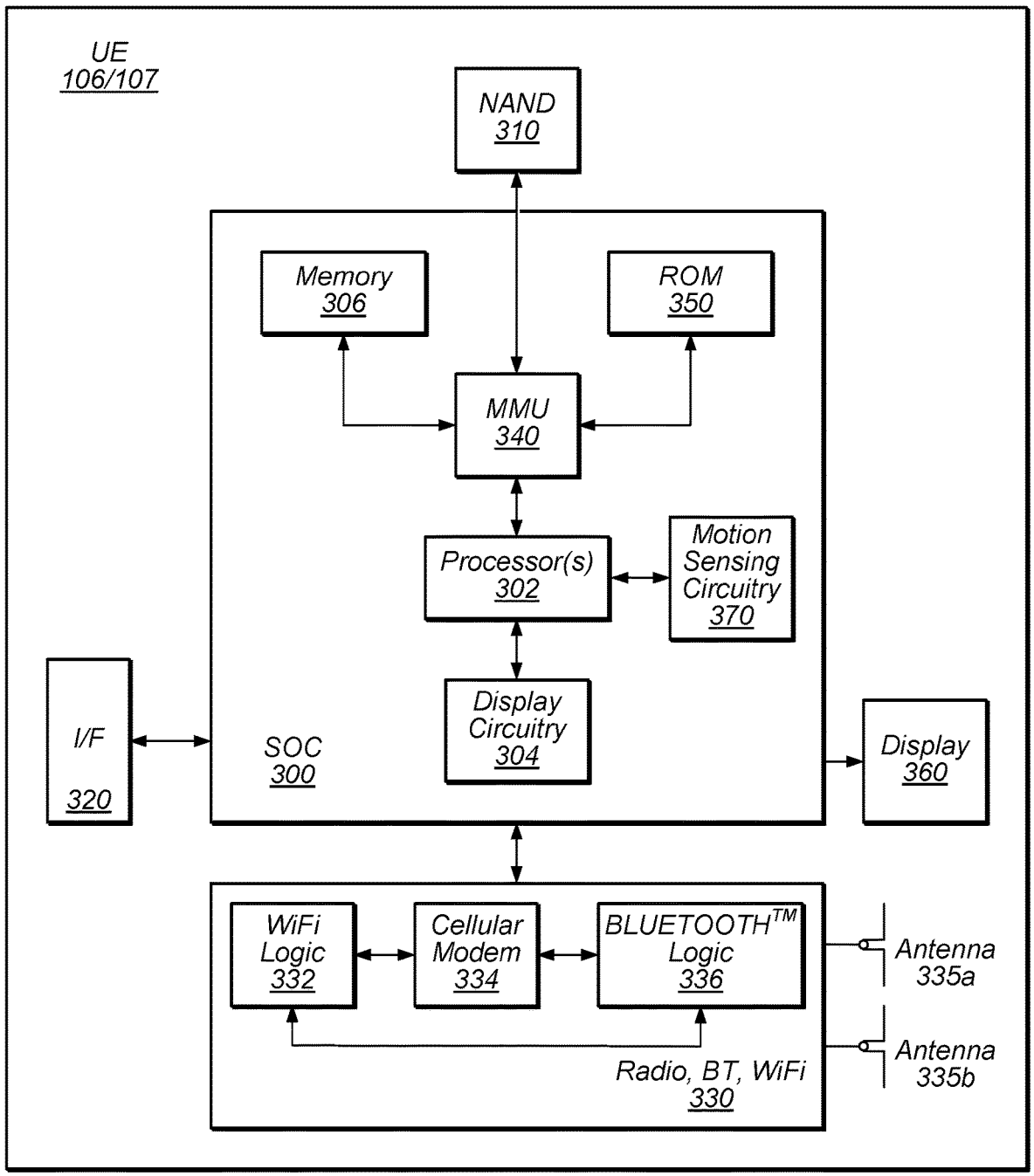
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
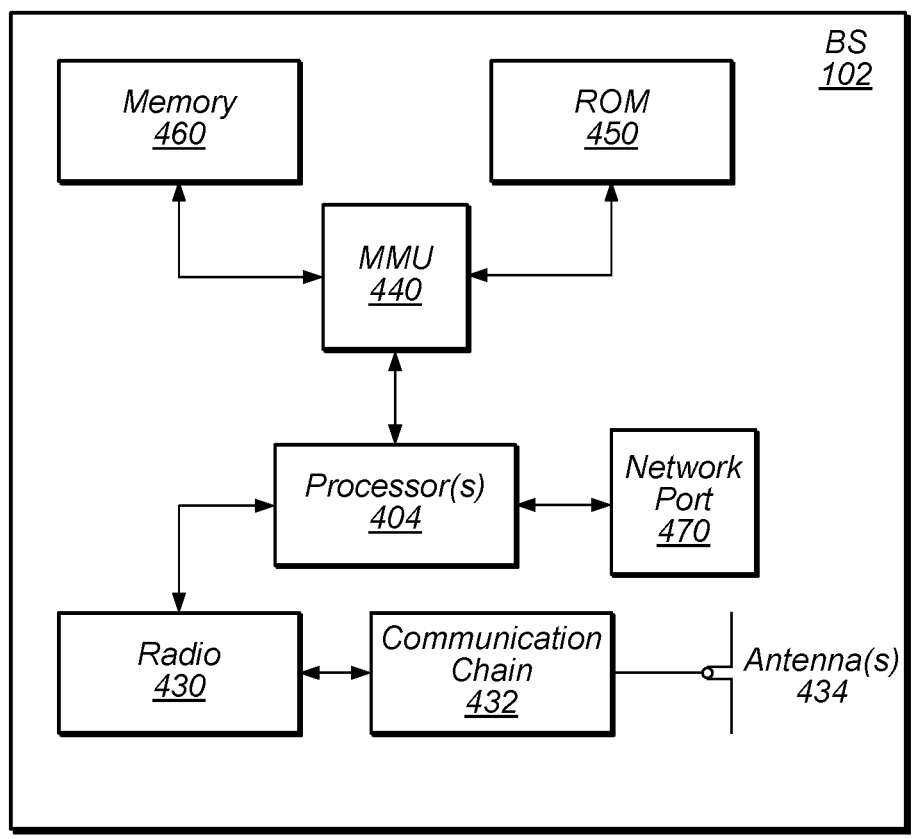
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
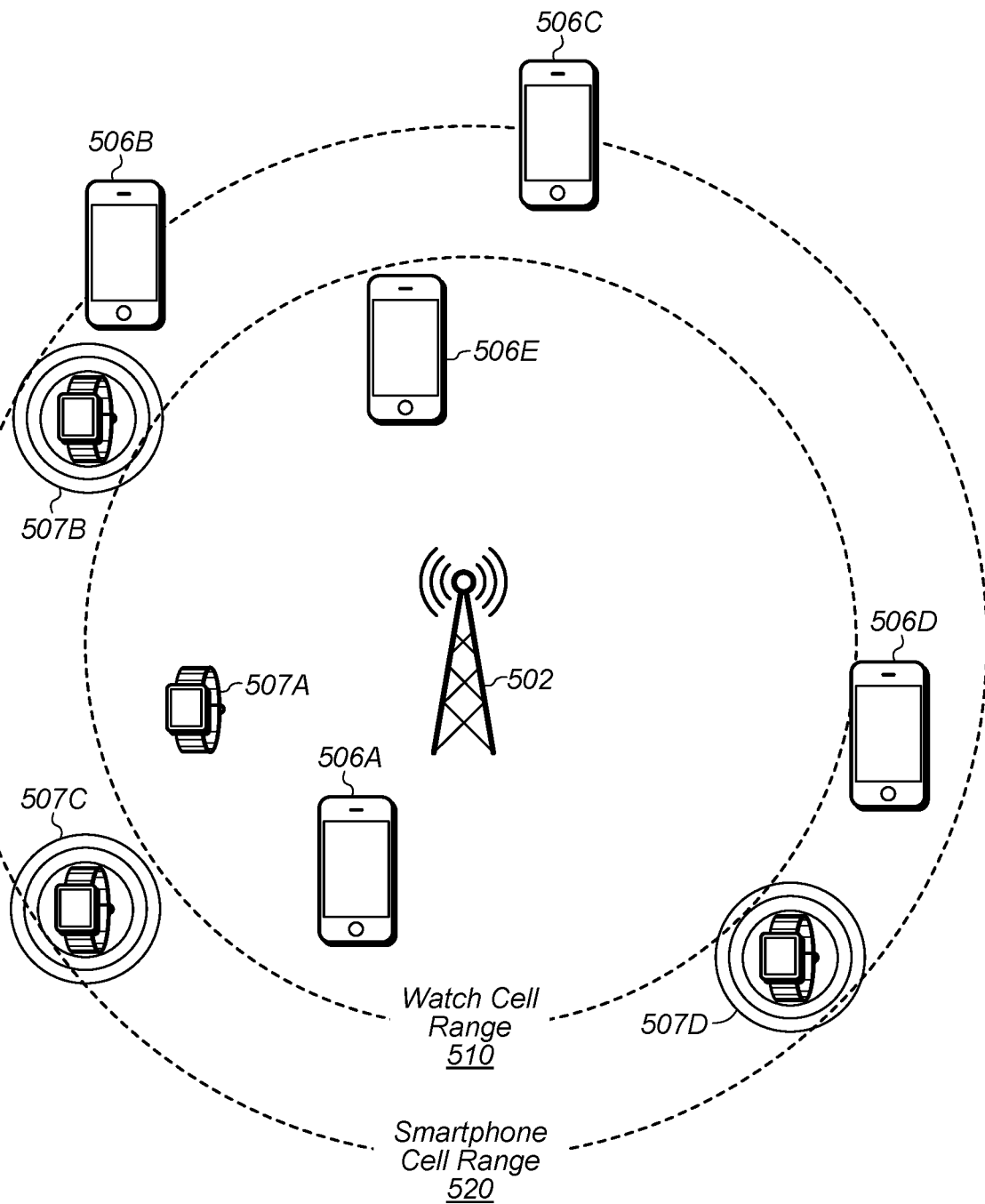
FIG. 5 illustrates a possible example coverage scenario for smartphones and smart watches, according to some embodiments.
Figure 6:
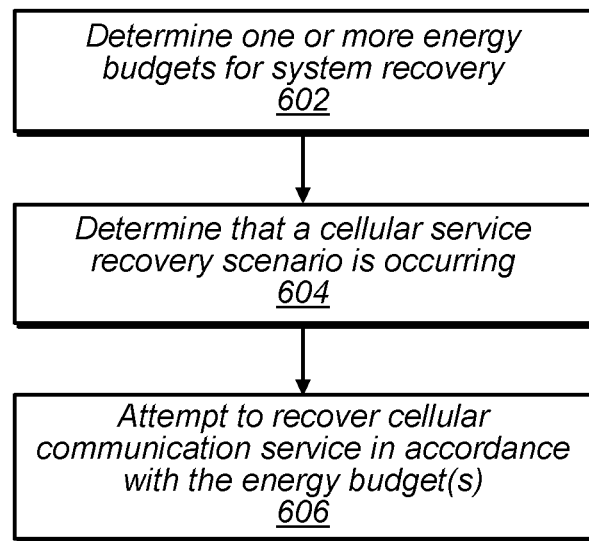
FIGS. 6-7 are flowchart diagrams illustrating exemplary methods for a wireless device to perform energy budgeted system recovery, according to some embodiments.

FIGS. 5-6—Example Coverage Scenario and Flowchart

FIG. 5 illustrates one possible example of a coverage scenario for smartphones and smart watches, according to some embodiments. As shown, a base station 502 may provide a cell for a variety of wireless devices, including various smartphones 506 and various smart watches 507. Such different types of devices may have differing characteristics that result in different effective communication ranges. Thus, as shown, the effective watch cell range 510 may be smaller than the effective smartphone cell range 520.

As a result, while all of the illustrated smartphones (506A, 506B, 506C, 506D, 506E) may be within communicative range of the base station 502 and thus may be able to receive cellular communication service from the cell, only one of the illustrated smart watches (507A) may be within communicative range of the base station 502, and the remainder of the illustrated smart watches (507B, 507C, 507D) may be outside of communicative range of the base station 502. Unless there are one or more other cells within range of these smart watches 507B-D, they may be unable to obtain cellular communication service and may accordingly experience cellular service loss.

Thus, since cellular base station deployment may at least in some instances be arranged to provide efficient cellular communication coverage for smartphones and other devices with similar cellular communication ranges, coverage scenarios such as illustrated in FIG. 5 may result in more common radio link failure and out-of-service events for smart watches and/or other devices with smaller than average cellular communication ranges (e.g., link budget limited devices).

When a wireless device experiences loss of service (e.g., goes out-of-service or is only able to obtain limited service), the wireless device may generally attempt to perform system recovery to regain cellular service. As one possibility, this may include a telescopic scan pattern with statically configured sleep intervals. In some instances, the choice of a particular inter-scan sleep interval may also be based on a device's motion state at the time. For example, larger sleep intervals may be used for slower motion states (e.g., a stationary motion state) in comparison to faster motion states (e.g., a walking or driving motion state).

However, attempts to regain cellular communication service when cellular communication service loss occurs can potentially be highly power consumption intensive. If battery drain incurred during a service recovery scan is not kept track of, there may be no upper bound on energy allocated for scans, and no way to allocate a certain power budget for scans in a guaranteed manner. As previously noted, in many instances, in addition to potentially having a relatively limited cellular communication range, many link budget limited devices may also be relatively power constrained. For example, many wearable devices may have relatively small battery reserve capacities, e.g., due to their wearable form-factor and/or other design considerations. Thus, guaranteeing a certain battery life regardless of the possible range of RF coverage conditions and possible system recovery scenarios that a wireless device may experience can be challenging, but may in at least some circumstances nonetheless be considered important.

Techniques that consider battery power as a limited resource when attempting system recovery may thus have a particularly notable beneficial effect on such link budget limited devices, at least in some instances. Accordingly, FIG. 6 is a flowchart diagram illustrating a method for a wireless device (e.g., an accessory device) to perform energy budgeted system recovery, according to some embodiments. Note that while such use of one or more energy budgets to potentially limit power consumption from cellular service recovery activities may be particularly beneficial to link budget limited devices, it should be noted that such techniques may also be beneficial to non-link budget limited wireless devices (e.g., including wireless devices with larger cellular communication ranges, such as the smartphones illustrated in FIG. 5). Accordingly, it should be noted that any or all aspects of the method of FIG. 6 may also or alternatively be used in conjunction with such devices if desired.

Thus, aspects of the method of FIG. 6 may be implemented by a wireless device, such as a UE 106 or 107 illustrated in and described with respect to FIGS. 1-3, or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional method elements may also be performed as desired. As shown, the method may operate as follows.

According to some embodiments, the wireless device may be an accessory device, such as a smart watch, with a smartphone paired as a companion device. The wireless device may pair with the companion device using one or more short range wireless communication technologies. Pairing the accessory device with the companion device may create a link between the devices such that the devices may be able to wirelessly communicate when within communication range of one another. According to some embodiments, a paired relationship between devices may optionally additionally include or enable one or more further characteristics, such as any or all of one or more shared settings, user profiles and/or accounts, data synchronization between the devices, etc.

The wireless device and the companion device may be capable of communicating with each other using any or all of Bluetooth, Wi-Fi, near field communication (NFC), and/or any of various other possible short range communication protocols, according to some embodiments. Additionally, each of the wireless device and the companion device may be capable of performing cellular communication, according to some embodiments.

Although each of the wireless device and the companion device may be capable of communicating according to multiple wireless communication technologies, at least according to some embodiments, the wireless device may have different characteristics than the companion device that may affect their respective preferred usage patterns and relationships. For example, as noted above, as one possibility the wireless device might be a smart watch (or other wearable device), while the companion device might be a smart phone, and the wireless device might have more limited battery capacity and degraded antenna performance relative to the companion device.

Alternatively, the wireless device may be a standalone device (or at least operating in a standalone mode), e.g., such that the wireless device is not currently paired with a companion device, if desired.

In 602, the wireless device may determine one or more energy budgets for system recovery. Determining the one or more energy budgets may also be referred to as selecting an energy budget set. Selecting the energy budget set may include selecting which of multiple possible energy budgets to use when performing system recovery, and/or selecting parameters for each selected energy budget.

The energy budget set may be selected based on any of various possible considerations. As one possible consideration, the wireless device may use a variety of different possible scan scopes at various times, and the current scan scope scenario or state of the wireless device may affect an energy budget set used by the wireless device (e.g., since different scan scopes may typically have different energy consumption profiles). In some instances, the scan scope for the wireless device may depend in turn on the degree to which the wireless device is aware of its location. For example, a different scan scope (and potentially energy budget set) may be selected depending on whether the wireless device knows a recently used cell, or does not know a recently used cell but knows a country (e.g., mobile country code or MCC) in which the wireless device is currently located, or does not know its location at all. As another possible consideration, the wireless device may select the energy budget set used at a given time based at least in part on the current battery level/reserves of the wireless device. For example, different energy budget sets may be selected for different battery level ranges. Other considerations are also possible.

Each energy budget may have various parameters associated with it, each of which may vary or be constant over time. One aspect of each energy budget may include the condition or time at which the energy budget is initiated. For example, an energy budget for managing average power consumption during each occurrence of a cellular service recovery scenario may be initiated such that a T=0 condition initiating use of the energy budget may occur upon entry into a cellular service recovery scenario. As another example, an energy budget for managing total energy consumption by cellular service recovery activities over periodic time windows (e.g., with each window potentially including multiple cellular service recovery scenarios) may be initiated such that a T=0 condition initiating use of the energy budget may occur upon powering on of the wireless device and potentially at every subsequent periodic interval according to the periodic time window size targeted by the energy budget, e.g., until powering off of the wireless device. As a further possibility, an energy budget that manages a total number of cellular service recovery scans that are performed over a given period of time may also or alternatively be used, if desired.

In 604, the wireless device may determine that a cellular service recovery scenario is occurring. The cellular service recovery scenario may include a scenario in which cellular service is lost and the wireless device attempts to obtain any (e.g., limited or normal) service, or a scenario in which limited cellular service (e.g., from a carrier that supports emergency calling but from which other services are not available, for example due to cellular service subscription characteristics of the wireless device) is available and the wireless device attempts to obtain normal cellular service (e.g., from a carrier that provides voice, data, and/or other services in accordance with a cellular service subscription of the wireless device), among various possible scenarios.

In some embodiments (e.g., in an out-of-service (OOS) scenario), determining that a cellular service recovery scenario is occurring may include determining that the wireless device has lost cellular communication service. For example, the signal strength of a cell to which the wireless device had been attached (e.g., a serving cell) may have decreased (e.g., due to movement of the wireless device away from the cell, increased interference, etc.) such that the wireless device is no longer able to communicate with the base station providing the cell, and the wireless device may not be aware of any suitable neighboring cells. Such a cellular communication service loss that occurs in idle mode may result in the wireless device being OOS. A loss of cellular communication service that occurs while in connected mode may trigger a radio link failure (RLF), in response to which certain RLF recovery procedures may be attempted. If successful, this may result in cellular service recovery (e.g., on the same serving cell from which cellular service was lost, or on a different serving cell), while if unsuccessful, this may result in the connection being released and OOS occurring.

In 606, the wireless device may attempt to recover/regain cellular communication service in accordance with the determined energy budget(s). Based on the cellular service recovery scenario that is occurring, the attempt to recover cellular service (which may also be referred to as attempting system recovery) may include performing one or more scans for cellular service. Timing of the one or more scans for cellular service may be determined based at least in part on the determined energy budget(s).

For example, for each respective energy budget of the selected energy budget set, a suggested next scan time may be determined, such that the parameters of the respective energy budget would not be violated. The suggested next scan time for each energy budget may be determined in any of various possible manners. As one possibility, once initiated, each energy budget may include an energy allowance over time, and may include a minimum balance of energy allowance credit to allow a service recovery scan, either or both of which may vary over time, if desired. Based on the energy allowance, an energy allowance credit for the energy budget may build up over time. The earliest time at which the energy allowance credit would reach the minimum balance of energy allowance credit to allow a service recovery scan may be selected as the suggested next scan time for the energy budget.

Note that in such an arrangement, when a cellular service recovery scan is performed, an estimated energy consumption associated with the cellular service recovery scan may be subtracted from the energy allowance credit for the energy budget, which may affect when the next suggested scan time for the energy budget. Additionally, at least in some instances, an estimated energy consumption associated with a sleeping/reduced power state preceding the cellular service recovery scan (e.g., since the energy allowance credit for the energy budget was previously calculated) may be subtracted from the energy allowance credit for the energy budget. The energy consumption associated with a cellular service recovery scan and/or the sleep state may be estimated in any of various ways, as desired. As one possibility, the wireless device may have on-board hardware and/or software configured to measure power consumption by the wireless device (or by certain portions of the wireless device), from which the wireless device may directly estimate the energy consumption caused by the cellular service recovery scan and/or sleep state based on measurements performed by the wireless device. As another possibility, the wireless device may store one or more models of power consumption caused by various cellular service recovery activites/parameters (e.g., including sleeping between scans), and may estimate the energy consumption caused by the cellular service recovery scan and/or sleep state using power consumption values provided by the power consumption model(s) for the cellular service recovery activites/parameters/duration (e.g., duration of time spent in scans and asleep prior to a scan, type/number of scans, whether they are focused frequency scans or blind complete band scans, the RF environment of the wireless device, etc.) encompassed by the cellular service recovery scan. In such a case, the power consumption model(s) may be generated by the wireless device vendor or any other desired party, e.g., based on external measurements, characterization, and modeling of energy consumption by the wireless device (or a comparable wireless device) in a variety of system recovery scenarios, or in any of various other possible manners. Other energy consumption estimation techniques are also possible.

In order to satisfy all of the energy budgets in the energy budget set, it may be the case that the latest suggested next scan time may be selected to perform the next scan for cellular service in the current cellular service recovery scenario. In some instances, a minimum interval between scans for cellular service (e.g., to ensure at least a minimum amount of time diversity between scans) and/or a maximum interval between scans for cellular service (e.g., to avoid excessive lengths of time without cellular service, potentially at the expense of remaining within all of the energy budgets in the selected energy budget set) may provide an additional constraint to selection of the next scan for cellular service in the current cellular service recovery scenario. For example, in some embodiments, it may be determined to perform the next scan for cellular service in the current cellular service recovery scenario at a time that satisfies a configured minimum interval between scans if that time is later than any of the suggested times to perform the next scan according to the energy budget set. Similarly, in some embodiments, it may be determined to perform the next scan for cellular service in the current cellular service recovery scenario at a time that satisfies a configured maximum interval between scans if that time is earlier than at least one of the suggested times to perform the next scan according to the energy budget set. In such embodiments, a latest time among the suggested times to perform the next scan according to the energy budget set may be selected as the time to perform the next scan for cellular service in the current cellular service recovery scenario if that time results in an interval greater than or equal to the configured minimum interval between scans since a previous scan for cellular service and if that time results in an interval less than or equal to the configured maximum interval between scans since the previous scan for cellular service.

Once the timing for the next scan for cellular service according to the current cellular service recovery scenario has been determined, the wireless device may perform the next scan for cellular service at the determined time. The scan may have any of various possible scan scopes, e.g., depending on the conditions in which the wireless device is operating. As previously noted, according to some embodiments, the scope for out-of-service (OOS) and/or limited service scans may be selected based at least in part on historical service and/or location information, to the degree such information is available. For example, according to some embodiments, an acquisition database used to select the cells searched for cellular service may be enhanced to include neighbor information for configured neighbors for the cell from which cellular service was lost, such that those configured neighbors for the cell from which cellular service was lost are included among those cells searched. Additionally (or alternatively, e.g., if such information is not available or is considered stale), the parameters and/or scope of an attempt to recover cellular service may include considering the current location (e.g., latitude/longitude coordinates from a global navigational satellite system (GNSS) module of the wireless device, mobile country code of a recently camped cell, etc.) of the wireless device.

Note that the motion state of the wireless device may also be considered in determining the scan scope (and/or the energy budget(s) for system recovery), if desired. For example, if the wireless device is rapidly moving, the expected recovery time between losing cellular service and regaining cellular service may be reduced, e.g., if the wireless device is moving from the coverage area provided by the cell from which the cellular service loss occurred to a cell from which cellular service can be regained. If the wireless device is stationary or only slowly moving, the expected service recovery time may be longer. Thus, according to some embodiments, the wireless device may determine a motion state of the wireless device, e.g., using motion sensing circuitry, such as one or more accelerometers, gyroscopes, vibration sensors, and/or other motion sensing components, which may be capable of sensing motion magnitude and/or type for various types of motion, and may select the cellular service recovery attempt characteristics based at least in part on the determined motion state. For example, the parameters of one or more energy budgets may be selected such that more frequent scans may be possible for faster motion states than for slower or stationary motion states, as one possibility.

Based on the first cellular service recovery scan in a given cellular service recovery scenario, the wireless device may successfully obtain cellular service (e.g., the scan may result in cellular service recovery), or may be unsuccessful (e.g, the scan may not result in cellular service recovery). If the first scan results in cellular service recovery, the wireless device may exit the cellular service recovery scenario (e.g., which may result in ending one or more energy budgets, such as a per recovery scenario energy budget) and begin or resume use of the normal (or limited) cellular service obtained.

If the first scan does not result in cellular service recovery, however, the wireless device may determine a time to perform a next (e.g, second) scan for cellular service according to the cellular service recovery scenario. Similar to the first scan for cellular service according to the cellular service recovery scenario, the time to perform the second scan for cellular service may be determined based at least in part on the one or more energy budgets for cellular service recovery. For example, a suggested next scan time may be determined according to each of the energy budgets, and the latest time among the suggested scan times may be selected as the time to perform the second scan according to the cellular service recovery scenario, possibly constrained by configured minimum and/or maximum intervals between scans. Note that the estimated energy consumption of the first scan for cellular service according to the cellular service recovery scenario (and potentially the estimated energy consumption during the preceding sleep state) may affect the selected scan time for the second scan, e.g., since (as previously noted) each energy budget may subtract the estimated energy consumption of each scan from the energy allowance credit for that energy budget, which may in turn affect when the minimum energy allowance credit to allow a scan is next reached for that budget, and thus what the next suggested scan time is for that budget.

Thus, if the first scan does not result in cellular service recovery, the wireless device may perform a second scan for cellular service according to the cellular service recovery scenario at the determined time to perform the second scan for cellular service according to the cellular service recovery scenario. Similarly, the wireless device may continue to perform subsequent scans for cellular service with timing selected based at least in part on the selected energy budget(s) in the cellular service recovery scenario until cellular service is recovered, and may determine scan timing during subsequent cellular service recovery scenarios in a similar manner.

Note that the wireless device may operate in a reduced power (e.g., sleeping) state between the first and second scans, at least according to some embodiments. For example, at least a portion of the cellular communication circuitry of the wireless device may be powered off or may operate in a reduced power condition between scans for cellular service, e.g., to reduce the power consumption of the wireless device during those times.

It should also be noted that the energy budget(s) used (and/or the parameters of the selected energy budget(s)) may be dynamically modified by the wireless device at any time. For example, if conditions experienced by the wireless device change (e.g., battery level falls below a threshold, motion state of the wireless device changes, location information ages out thereby affecting scan scope, etc.) in a manner configured to affect which energy budget(s) are used and/or the parameters of one or more budgets, the energy budget(s) and/or parameters of the energy budget(s) selected for use by the wireless device may in turn be changed to reflect the updated conditions. This may further in turn affect scan timing for subsequent scans for cellular service performed by the wireless device.

Thus, a wireless device utilizing energy budgeted system recovery techniques may be able to actively manage the power consumption of its system recovery activities, controlling its scanning activities in such a way as to attain one or more budget goals simultaneously, e.g., despite the cost of a scan potentially being unknown until it is actually completed. Such techniques may facilitate managing the battery power of the wireless device as a potentially limited resource (e.g., when the wireless device is not connected to an external power source) and may allow the wireless device to guarantee a certain battery life in any of various possible wireless coverage conditions, at least according to some embodiments, e.g., recognizing that this may be important to wireless device users, at least in certain circumstances and/or for certain types of wireless devices.

FIGS. 7-12—Additional Information

FIGS. 7-12 and the description thereof are provided by way of example of further possible techniques and details that could be used in conjunction with the method of FIG. 6, and are not intended to be limiting to the disclosure as a whole. Numerous alternatives to and variations of the details provided herein below are possible and should be considered within the scope of the present disclosure.

Figure 7:
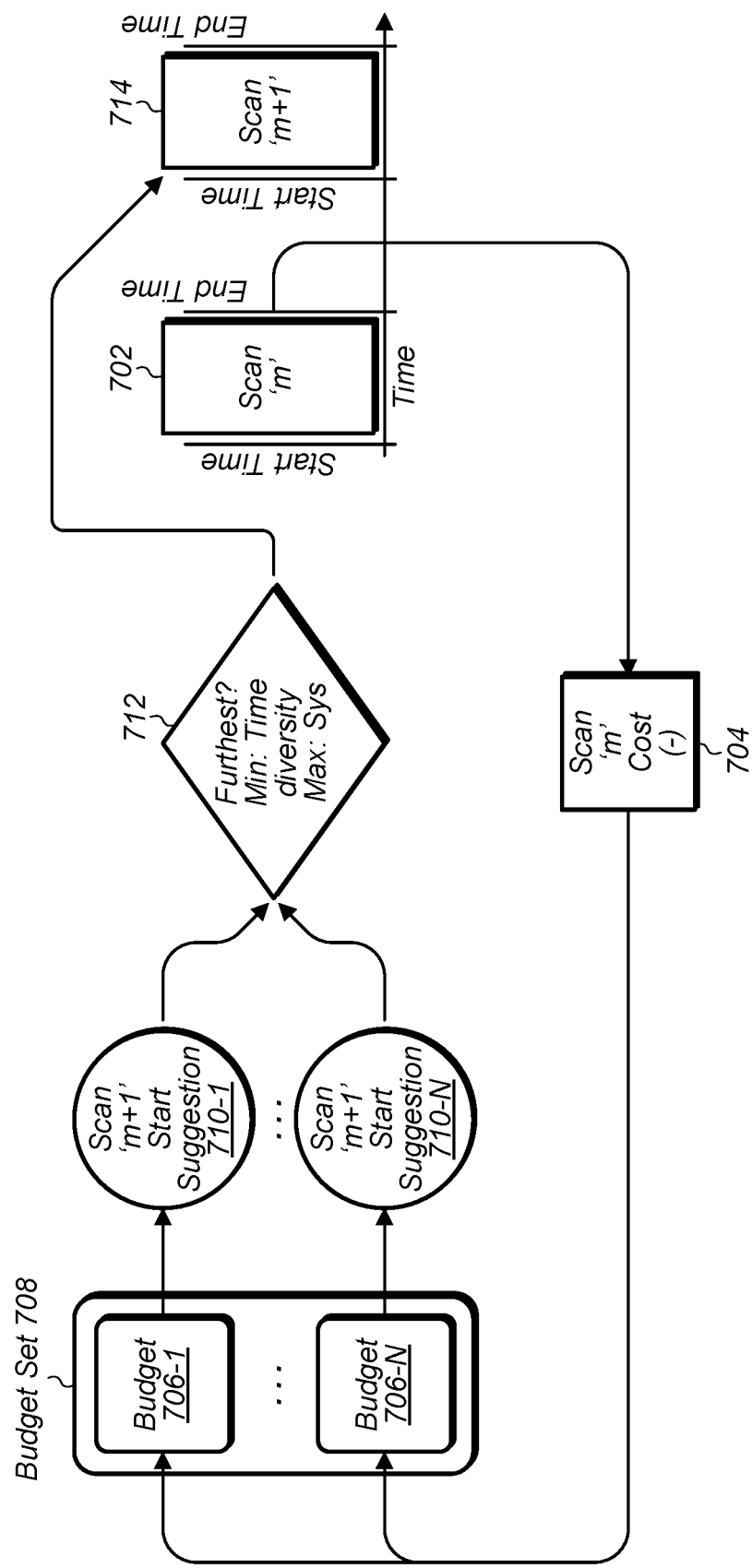

FIG. 7 is a flowchart diagram illustrating one possible technique for selecting a next scan time during system recovery given a selected set of energy budgets, according to some embodiments. As shown, after a scan 'm' 702, the energy cost of scan m 704 may be determined (e.g., estimated) and input into each energy budget 706-1 . . . 706-N of an energy budget set 708. For each energy budget 706-1 . . . 706-N, a corresponding start time suggestion 710-1 . . . 710-N for the next scan 'm+1' 714 may be determined. In decision 712, the latest suggested start time may be selected as the start time for the scan 'm+1', provided the latest suggested start time does not contradict a configured minimum interval between scans (e.g., to provide at least a minimum amount of time diversity between scans) or a configured maximum interval between scans (e.g., to avoid excessive intervals between scans). At the selected start time, the next scan m+1 714 may be performed.

The method of FIG. 7 may be repeated as needed, e.g., to determine scan timing on each occasion that a system recovery scan is desired. Such occasions may occur to determine scan timing for multiple scans within a single recovery timeline and/or across multiple recovery timelines, as desired.

Figure 8:
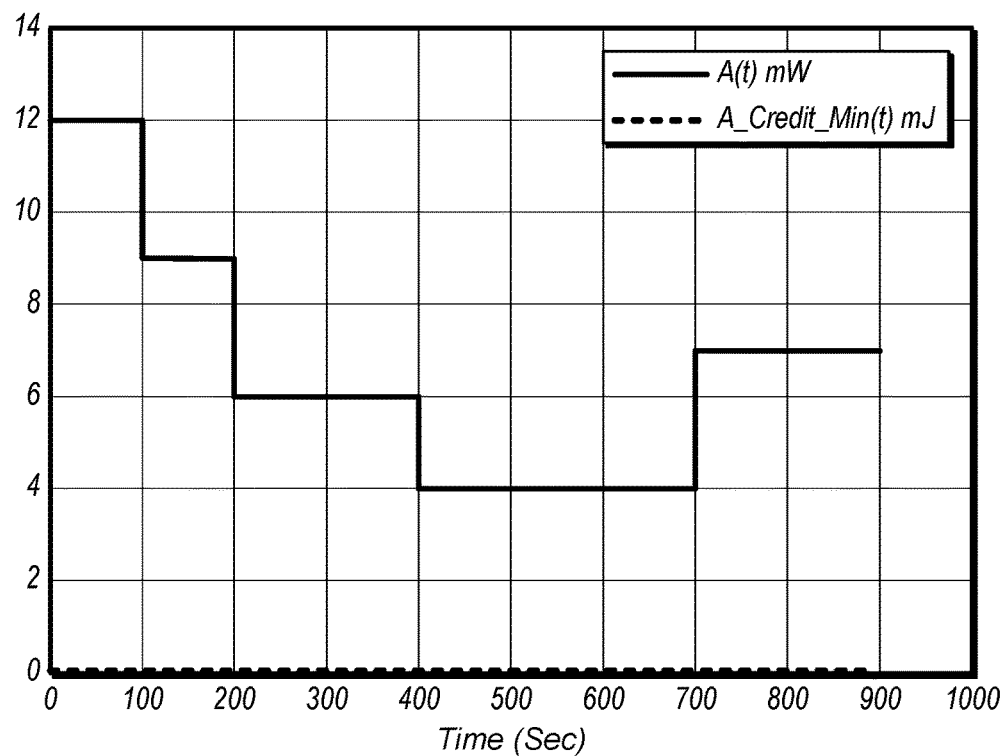
FIGS. 8-9 are graphs illustrating possible energy budgets that could be used in conjunction with energy budgeted system recovery techniques, according to some embodiments.
Figure 9:
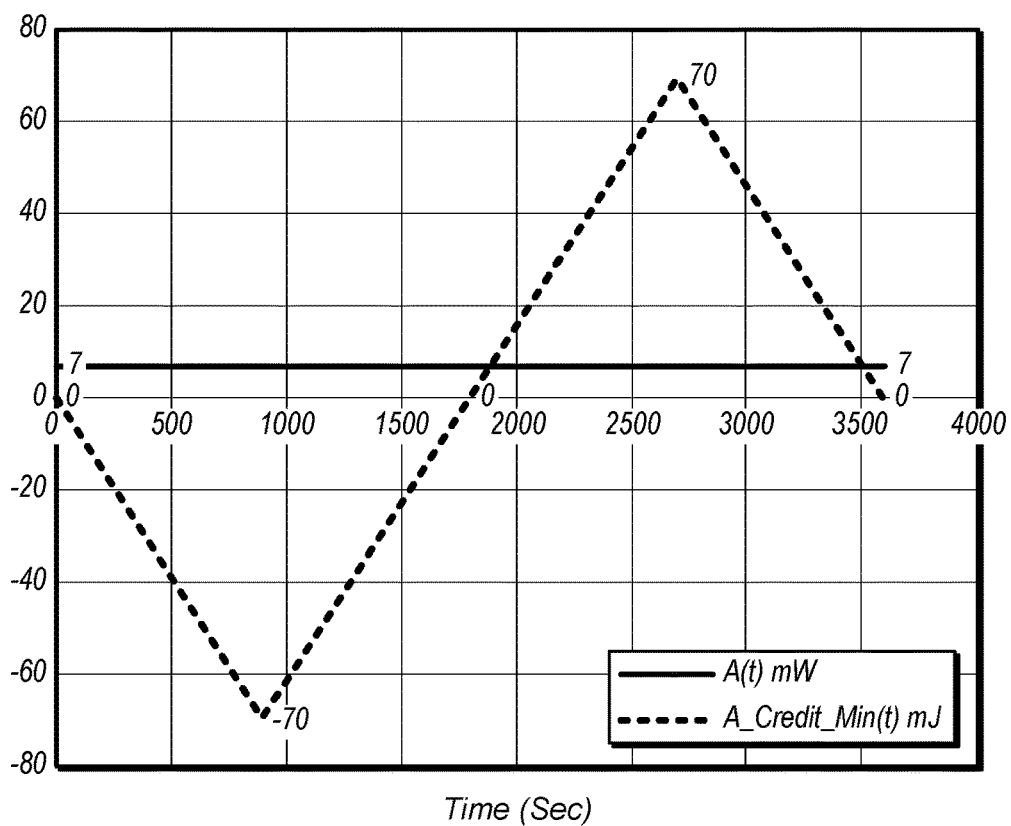

The energy budgets used to determine the set of suggested next scan times may be configured in any of various manners, as desired. FIGS. 8-9 are graphs illustrating two possible energy budgets that could be used that follow one possible budgeting algorithm, according to some embodiments.

According to the budgeting algorithm of FIGS. 8-9, each budget may be designed to include a power allowance (A(t)) as a plot over time. This parameter may either be statically configured (e.g., as shown in FIGS. 8-9), or may be dynamically scaled according to various considerations, such as the motion state of the wireless device utilizing the energy budget. Each budget may further be designed to include a minimum balance of allowance credit (A_Credit_Min(t)) that must have built up before the budget can approve a scan at any time 't', where the credit built up over an interval Δt is the area under the graph A(t) for that interval.

FIG. 8 illustrates an exemplary possible per-recovery occurrence power budget, e.g., where T=0 represents the entry into a system recovery timeline. As shown, for this exemplary budget the power allowance may be relatively high for an initial portion of the system recovery timeline, then may step down incrementally to a minimum level after some time, and eventually may level out for the remainder of the system recovery timeline. In this example, A_Credit_Min(t) may be constant at 0 for the entire system recovery timeline.

FIG. 9 illustrates an exemplary possible hourly power budget, e.g., where T=0 represents the device power-on instant, and every 1 hour thereafter. As shown, for this exemplary budget the power allowance may be constant over the system recovery timeline. In contrast, in this example, A_Credit_Min(t) may initially be set at 0, but may decrease over time to a configured minimum level, then increase over time to a configured maximum level, then again decrease back to the starting value. Such variation in A_Credit_Min(t) may be used to alter the pace at which scans are scheduled during the recovery timeline, if desired.

Note that while the exemplary possible energy budgets of FIGS. 8-9 represent two possible energy budgets, any number of different energy budgets (e.g., with different initialization conditions and/or power management goals) and/or different A(t) and/or A_Credit_Min(t) plots may be used, as desired.

Figure 10:
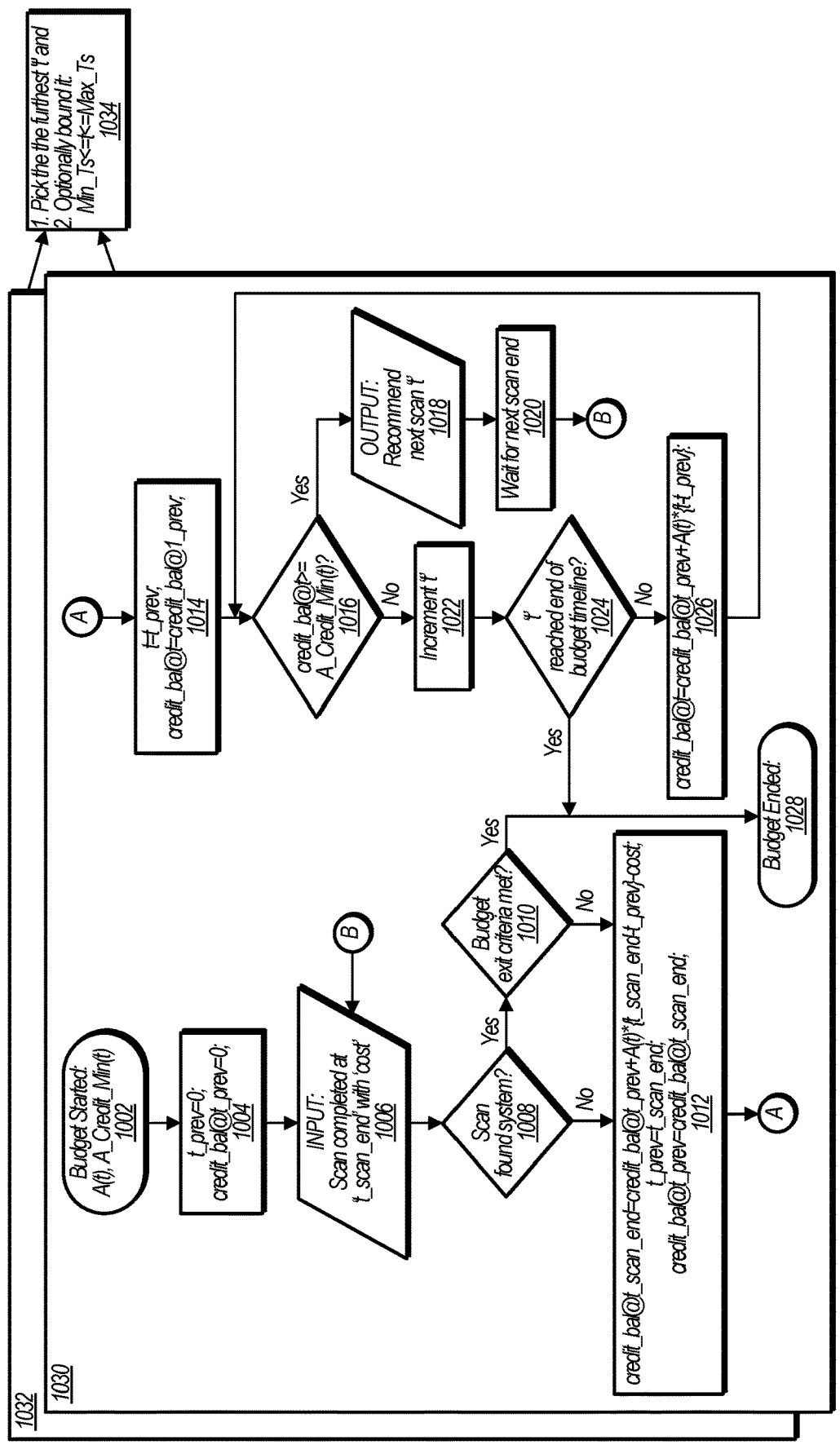
FIG. 10 illustrates a possible technique for determining a time at which to perform a next system recovery scan in accordance with a set of energy budgets, according to some embodiments.

FIG. 10 is a flowchart diagram illustrating further details of an exemplary possible algorithm for determining a next scan start time during a system recovery timeline, according to some embodiments. In the illustrated example, an algorithm is shown for determining suggested scan start times as needed according to a first energy budget 1030. A similar algorithm (e.g., but using different parameters) may be used for each additional energy budget used (e.g., for energy budget 1032 of FIG. 10). At each occasion when a suggested start time for the next system recovery scan is provided by each energy budget of the selected energy budget set, in 1034 the latest of those suggested start times may be selected, optionally bounded by a 'Min_Ts' value (e.g., to provide sufficient time diversity in the scan pattern) and/or a Max_Ts' value (e.g., to ensure a known upper bound on service recovery time should optimal RF conditions return).

As shown, at budget initialization 1002, the A(t) and A_Credit_Min(t) plots for the budget may be determined. In 1004, 't_prev' and 'credit_bal@t_prev' may be set to 0. Credit_bal@t_prev may generally represent the allowance balance when it was last computed and recorded, taking into consideration A(t) and the cost of the last scan, if any has occurred yet. T_prev may represent the instant when credit_bal@t_prev was last computed and recorded.

In 1006, information may be input to the budget indicating that a scan was completed at 't_scan_end' (generally the time when the last scan ended, or 0 for the first scan after initializing the budget; this is also the time when the computation may generally be performed regarding the suggested time for the next scan) with an indicated cost (generally representing the estimated energy cost of the last scan performed, possibly including the estimated energy cost of the sleep state preceding the last scan performed), or 0 for the first scan after initializing the budget since no scan has been performed since initializing the budget in this case).

In 1008, it may be determined if the scan found a system. For example, if a serving cell capable of providing the targeted services is found with sufficient strength to obtain service from, the wireless device may perform system acquisition for and attach to that cell. If this does occur, in 1010, it may be determined if the budget exit criteria have been met. For example, if the budget is a per-recovery-timeline energy budget, successful system acquisition may be the exit criterium for the budget, in which case the budget exit criteria may have been met. In case the budget exit criteria have been met, in 1028 the budget may be ended. Note that in this case the budget may be re-instantiated at a later time, e.g., upon an initialization trigger for the budget. However, if the budget exit criteria are not met by the successful system acquisition (for example, if the budget is an hourly or other periodic energy budget), or if the scan did not result in service recovery (e.g., if the budget was just initialized and no scan has actually been performed yet since initialization of the budget), in 1012 the budget may update its values for credit_bal@t_scan_end, t_prev, and credit_bal@t_prev, e.g., as follows:

credit_bal@t_scan_end=credit_bal@t_prev+
   {t_scan_end−t_prev}−cost;
t_prev=t_scan_end;
credit_bal@t_prev=credit_bal@t_scan_end.

In 1014, the budget may update its values for t and credit_bal@t, e.g., as follows:
t=t_prev;
credit_bal@t=credit_bal@t_prev.

In 1016, it may be determined if credit_bal@t is greater than or equal to A_credit_Min(t), i.e., such that sufficient credit is available to recommend a scan at the time t. If credit_bal@t is greater than or equal to A_credit_Min(t), in 1018, the budget may suggest the time t as the time at which to perform the next scan, and in 1020, may wait (e.g., in a reduced power/sleeping state) for the end of the next scan (e.g., which may be at the time t suggested by the budget 1030, or at a different time proposed by another budget in the budget set or a time selected based on a minimum or maximum scan interval constraint), at which time the method may return to 1006. If credit_bal@t is not greater than or equal to A_credit_Min(t), in 1022, the budget may increment t. In 1024, it may be determined if t has reached the end of the budget timeline (e.g., if the budget is an hourly or other periodic energy budget and the end of the period has been reached). If t has reached the end of the budget timeline, in 1028, the budget may be ended. Otherwise, if t has not reached the end of the budget timeline, in 1026 the budget may update its value for credit_bal@t, e.g., as follows:

credit_bal@t=credit_bal@t_prev+A(t)*{t−t_prev}.

The budget may then return to 1016, and may continue to proceed through the algorithm until the budget exit criteria are met, outputting the earliest t such that the projected credit balance will be able to overcome cost with a margin of at least A_Credit_min(t) at time t whenever there is a need at t_scan_end to find out when to schedule the next scan at a later time 't'.

Figure 11:
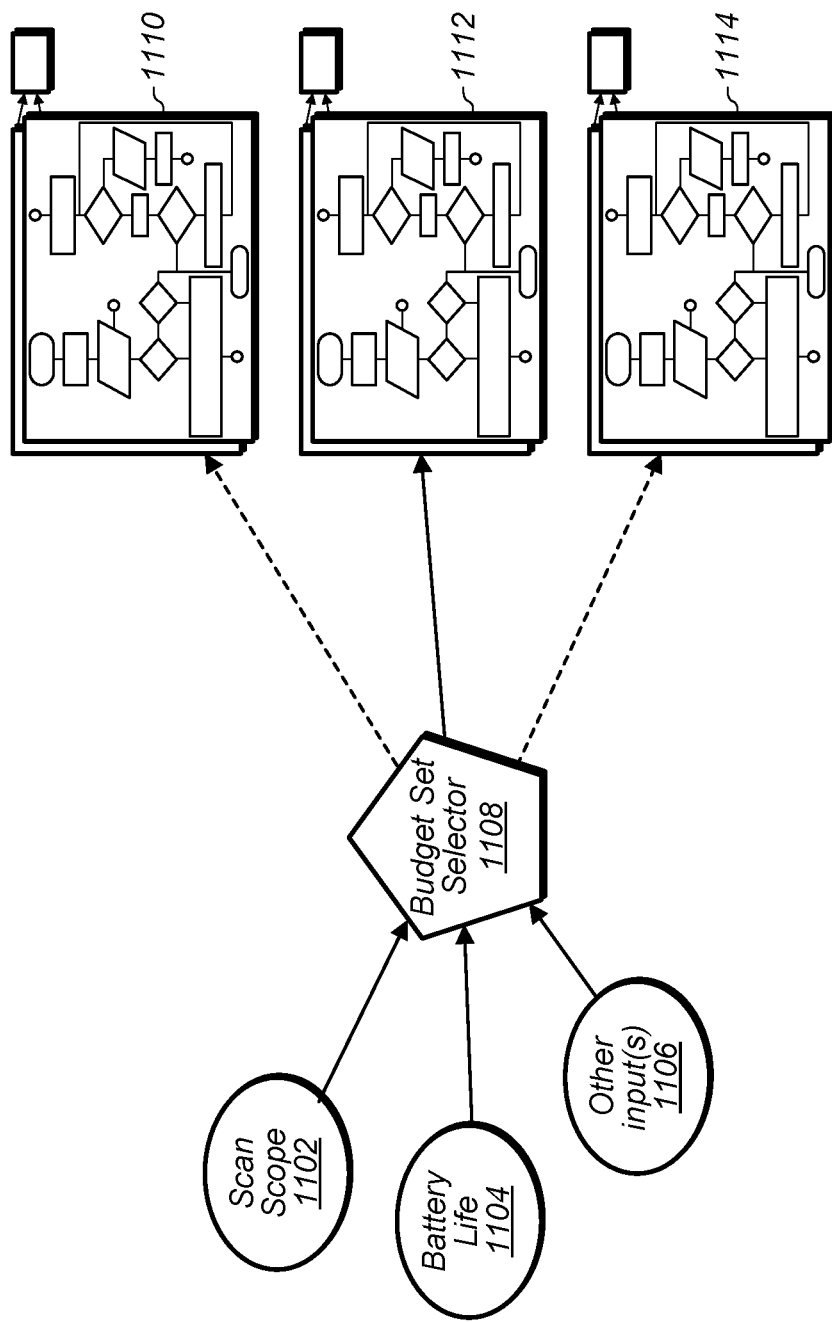
FIG. 11 illustrates a possible technique for determining an energy budget set that could be used in conjunction with energy budgeted system recovery techniques, according to some embodiments.

As previously noted, at least in some instances the budget set used by a device implementing energy budgeted system recovery techniques may be dynamically selected. FIG. 11 illustrates one possible algorithm for such a device to select a budget set, according to some embodiments. In the illustrated example, the current scan scope state 1102 and battery life state 1104 may be input into a budget set selector function 1108. Any number of other input(s) 1106 (e.g., based on other aspects of the current system state) may also or alternatively be provided to the budget set selector function 1108, as desired. Based on the input conditions, the budget set selector function 1108 may choose a budget set from a number of configured budget set options 1110, 1112, 1114, as shown, or may dynamically generate a budget set. In the illustrated example, the budget set selector function 1108 may currently be selecting the budget set 1112. At different times (e.g., when the input parameters to the budget set selector function 1108 change), the budget set selector function 1108 may dynamically select a different budget set.

Figure 12:
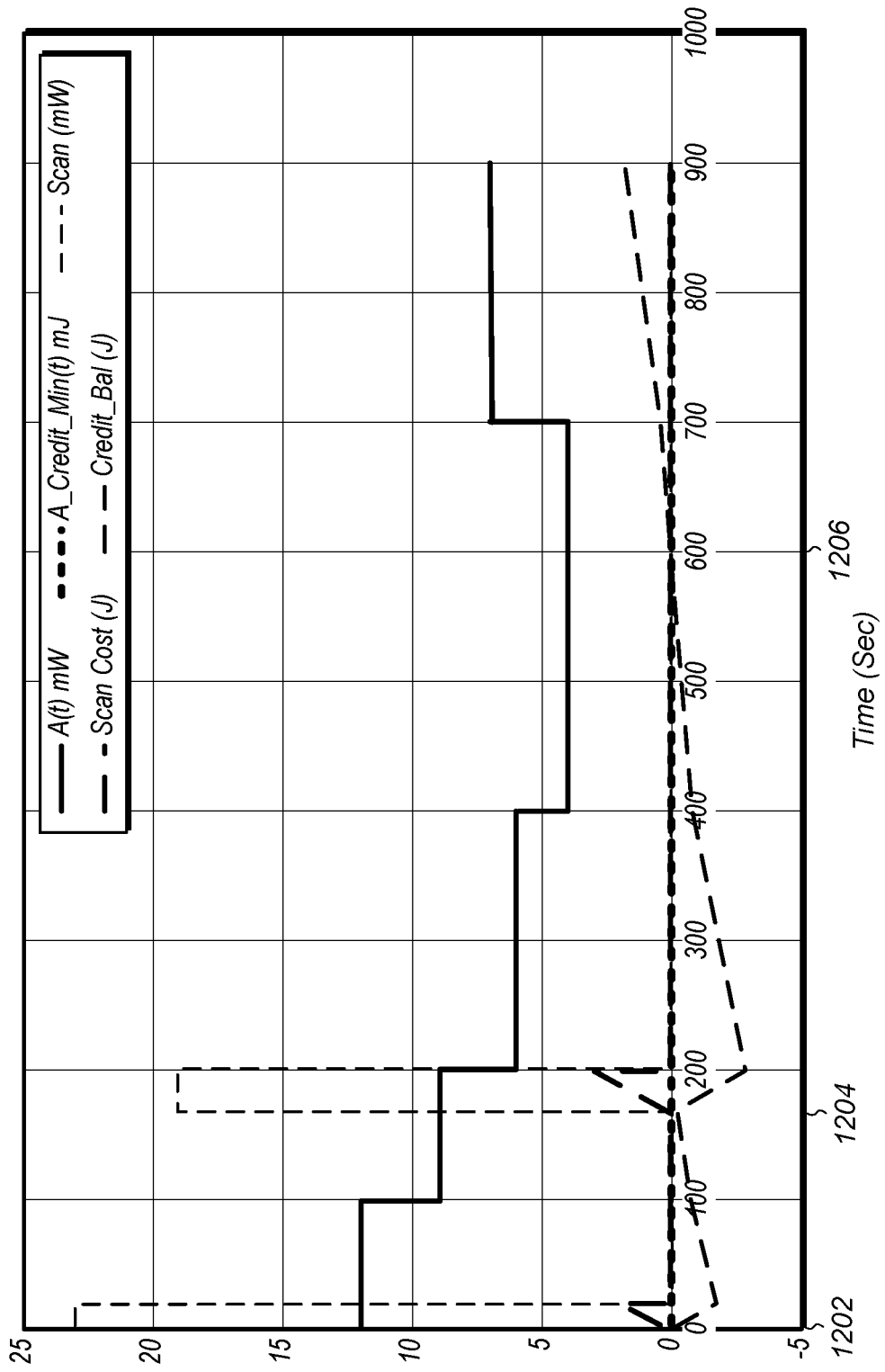
FIG. 12 is a graph illustrating how various parameters of a possible energy budgeted system recovery algorithm could develop over time in an example scenario, according to some embodiments.

FIG. 12 is a graph illustrating how various parameters of a possible energy budgeted system recovery algorithm could develop over time in an example scenario, according to some embodiments. The illustrated graph shows A(t) (in mW) and A_Credit_Min(t) (in mJ) as well as the resulting credit balance (in J) for one energy budget of a set of energy budgets used in the example scenario. Additionally, the illustrated graph shows the power consumed by scanning (in mW) and the estimated or measured accumulated energy cost of each scan (in J). At time T=0 1202, the credit balance is at least equal to A_Credit_Min(t) for the illustrated energy budget as well as the other energy budgets in use, and so a first scan occurs. The energy consumption of the first scan reduces the credit balance for the energy budget to a negative value (e.g., that is well below A_Credit_Min(t)), but over time after the scan is complete the allowance credit balance builds back up to eventually reach 0 and meets the threshold to allow a scan, at a time 1204 that is at approximately T=170 s. In the illustrated scenario, the time 1204 also meets threshold to allow a scan for each other budget of the budget set, and so a second scan occurs.

The energy consumption of the second scan again reduces the credit balance for the energy budget to a negative value (e.g., that is well below A_Credit_Min(t)), but over time after the scan is complete the allowance credit balance builds back up to eventually reach 0 and meets the threshold to allow a scan, at a time 1206 that is at approximately T=600 s. Notably, since A(t) is generally lower during this later interval than during the interval between the first scan and the second scan, the later interval is in turn considerably longer than the interval between the first scan and the second scan. In the illustrated scenario, the time 1206 does not meet the threshold to allow a scan for at least one other budget of the budget set, and so no scan occurs at the time 1206. Accordingly, the allowance credit balance continues to build up through the end of the time period illustrated in FIG. 12.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs.

Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An apparatus, comprising:
   a memory medium comprising program instructions; and
   a processing element coupled to the memory medium, the processing element configured to execute the program instructions to cause a wireless device to:
   obtain cellular communication service to a serving cell;
   measure a signal strength of the serving cell;
   determine that the signal strength of the serving cell is below a threshold;
   perform, in response to the determination that the signal strength of the serving cell is below the threshold, a first neighbor cell search;
   determine that the first neighbor cell search is not successful;
   determine a level of remaining battery power;
   determine, based at least in part on the level of remaining battery power, an interval until a second neighbor cell search; and
   perform, after the interval, the second neighbor cell search.

2. The apparatus of claim 1, wherein the interval until the second neighbor cell search is also based at least in part on an estimated energy consumption of the first neighbor cell search.

3. The apparatus of claim 2, wherein the energy consumption of the first neighbor cell search is estimated based on an energy consumption model for a plurality of possible service recovery activities and service recovery activity parameters and a determination of service recovery activities and service recovery activity parameters used in first neighbor cell search.

4. The apparatus of claim 2, wherein the energy consumption of the first neighbor cell search is estimated using energy consumption measurement circuitry of the wireless device.

5. The apparatus of claim 1, wherein the interval until the second neighbor cell search is further based at least in part on a total budgeted number of neighbor cell searches over a period of time.

6. The apparatus of claim 1, wherein the interval until the second neighbor cell search is also based at least in part on an average power consumption budget for service recovery activities.

7. The apparatus of claim 1, wherein the interval until the second neighbor cell search is also based at least in part on a budget for total energy consumed by service recovery activities over a period of time.

8. A wireless device, comprising:
   an antenna;
   a radio coupled to the antenna; and
   a processing element coupled to the radio;
   wherein the wireless device is configured to:
   obtain cellular communication service to a serving cell in idle mode;
   perform a first neighbor cell search;
   determine a current battery level;
   determine, based at least in part on the current battery level, timing of one or more searches for cellular service based at least in part on the determined current battery level, wherein the timing includes an interval until a second neighbor cell search; and
   perform, after the interval, the second neighbor cell search.

9. The wireless device of claim 8, wherein a parameter of the second neighbor cell search is based at least in part on a location of the wireless device.

10. The wireless device of claim 8, wherein the interval is based at least in part on a configured minimum interval.

11. The wireless device of claim 8, wherein the interval is based at least in part on a configured maximum interval.

12. The wireless device of claim 8, wherein the interval is based at least in part on an energy allowance over time and a minimum balance of energy allowance credit.

13. The wireless device of claim 8, wherein to determine a current battery level, the wireless device is configured to determine a current battery level range of a plurality of battery level ranges.

14. The wireless device of claim 8, wherein the interval is based at least in part on a total number of neighbor cell searches over a given period of time.

15. The wireless device of claim 8, wherein the interval is based at least in part on a scan scope of the second neighbor cell search.

16. The wireless device of claim 15, wherein the scan scope includes one of:
   an attempt to obtain limited or normal service; or
   an attempt to obtain normal service.

17. A method, comprising:
   by a wireless device:
   establishing a connection to a serving cell;
   measuring a signal strength of the serving cell;
   determining that the signal strength of the serving cell is below a threshold;

performing, in response to the determination that the signal strength of the serving cell is below the threshold, a first neighbor cell search;

determining that the first neighbor cell search does not find a neighboring suitable cell;

determining a level of remaining battery power;

determining, based at least in part on the level of remaining battery power, an interval until a second neighbor cell search; and performing, after the interval, the second neighbor cell search.

18. The method of claim 17, wherein the interval until the second neighbor cell search is also based at least in part on an estimated energy consumption of the second neighbor cell search.

19. The method of claim 17, wherein the method further comprises:

operating in a reduced power state between the first neighbor cell search and the second neighbor cell search.

20. The method of claim 19, wherein the interval until the second neighbor cell search is also based at least in part on an estimated energy consumption associated with the reduced power state.

* * * * *